(12) United States Patent
Andoh

(10) Patent No.: US 7,362,539 B2
(45) Date of Patent: Apr. 22, 2008

(54) DISK DRIVE AND METHOD OF CONTROLLING THE SAME

(75) Inventor: Haruo Andoh, Kanagawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 11/288,685

(22) Filed: Nov. 28, 2005

(65) Prior Publication Data
US 2006/0132959 A1    Jun. 22, 2006

(30) Foreign Application Priority Data
Dec. 21, 2004    (JP)    ............... 2004-370284

(51) Int. Cl.
G11B 5/596    (2006.01)
G11B 21/02    (2006.01)

(52) U.S. Cl. ............. 360/78.04; 360/75; 711/111
(58) Field of Classification Search ............. None
See application file for complete search history.

(56) References Cited

U.S. PATENT DOCUMENTS 5,890,209 A * 3/1999 Dobbek ............. 711/112
6,603,621 B1 * 8/2003 Kigami et al. ............. 360/61
2002/0091964 A1 * 7/2002 Cheok et al. ............. 714/6
2004/0148543 A1 * 7/2004 Eto et al. ............. 714/5

FOREIGN PATENT DOCUMENTS

JP    09-167457    6/1997

* cited by examiner

Primary Examiner—Andrew L. Sniezek
(74) Attorney, Agent, or Firm—Townsend and Townsend and Crew LLP; Darren Gold

(57) ABSTRACT

Embodiments of the invention provide a disk drive capable of preventing the deterioration of performance. In one embodiment, a disk drive includes a disk medium; a head capable of performing a read/write operation for accessing the disk medium to read information from and to write information to the disk medium; a head controller for controlling the position of the head so that the head describes a substantially spiral trajectory relative to the disk medium; and a controller capable of controlling the head controller, of performing a read/write operation for reading or writing information with reference to an identifier table associating sector identifiers identifying sectors on a specified track with logical block addresses, and of creating an identifier table for a track to be accessed next during the read/write operation.

10 Claims, 2 Drawing Sheets

Primary defect map

Fig 3

| Sector identifier (Sector ID) | Logical address (LBS) | Alternative sector, |
|---|---|---|
| a a a a | x x x x | None |
| b b b b | y y y y | p p p p |
| ⋮ | ⋮ | ⋮ |

Columns grouped as: I (Sector identifier), L (Logical address), D (Alternative sector).

DISK DRIVE AND METHOD OF CONTROLLING THE SAME

CROSS-REFERENCES TO RELATED APPLICATIONS

This application claims priority from Japanese Patent Application No. JP2004-370284, filed Dec. 21, 2004, the entire disclosure of which is incorporated herein by reference.

BACKGROUND OF THE INVENTION

The present invention relates to a disk drive, such as a hard disk drive, and a method of controlling the disk drive.

In most cases, a hard disk included in a hard disk drive is provided with a plurality of concentric circular tracks each divided into a plurality of sectors.

To access a disk, a host computer specifies a sector to be accessed by, for example, a logical block address (LBA). A hard disk controller included in a hard disk drive converts the LBA into information specifying a physical sector position on the disk and moves a head to the physical sector position.

The head is moved by the following head moving operation. The hard disk controller converts the LBA into a cylinder head sector parameter (CHS parameter). The hard disk controller specifies a track to be accessed by information, specifying a cylinder and the head, included in the CHS parameter and moves the head to the specified track. This head moving operation is called a seek operation.

The hard disk controller creates an identifier table (ID table) associating identifiers identifying sectors on the specified track with LBAs of the sectors during the seek operation. After the completion of the seek operation, the hard disk controller determines an identifier identifying the sector indicated by the specified LBA with reference to the ID table. The sector identified by the thus determined identifier is located at a position corresponding to the head, and then the sector is accessed.

A recently proposed sequential access system moves the head from track to track without performing the seek operation. The sequential access system repeats an access operation that accesses the sectors of one track sequentially, and then accesses the sectors of another track radially next to the former track. Access systems that move the head from track to track without performing the seek operation includes a spiral track system that uses a disk provided with tracks continuously formed in a spiral and a spiral access system, such as that disclosed in Patent document 1 (Japanese Patent Laid-open No. 9-167457), and that moves the head for reading and writing along a spiral path relative to concentric tracks.

BRIEF SUMMARY OF THE INVENTION

The seek operation for seeking tracks is not performed when a sequential access operation is performed by the spiral track system or the spiral access system that moves the head along a spiral path. Therefore, there is practically no seek time. Whereas the sequential access system moves the head from one to another of the successive tracks in sequential order accesses the sectors sequentially, the spiral access system moves the head along the spiral path from track to track.

Therefore, the ID table that is to be created in the seek time cannot be created. The conventional access system interrupts the access operation before moving the head from one to the next track, creates an ID table, and then resumes the access operation to access the next track after the ID table has been created. Consequently, the performance of the hard disk drive is deteriorated to an extent corresponding to time necessary for creating the ID table.

The present invention has been made in view of the foregoing problems and it is one of the features of the present invention to provide a disk drive capable of operating without deteriorating its performance.

The present invention provides a disk drive including: a disk medium; a head capable of performing a read/write operation for accessing the disk medium to read information from and to write information to the disk medium; a head controller for controlling the position of the head so that the head describes a substantially spiral trajectory relative to the surface of the disk medium; and a controller capable of controlling the head controller, of performing a read/write operation for reading or writing information with reference to an identifier table associating sector identifiers identifying sectors on a specified track with logical block addresses and of creating an identifier table for a track to be accessed next during the read/write operation.

BRIEF DESCRIPTION OF THE DRAWINGS

FIG. 3 is a diagrammatic view of assistance in explaining an identifier table.

DETAILED DESCRIPTION OF THE INVENTION

Figure 1:
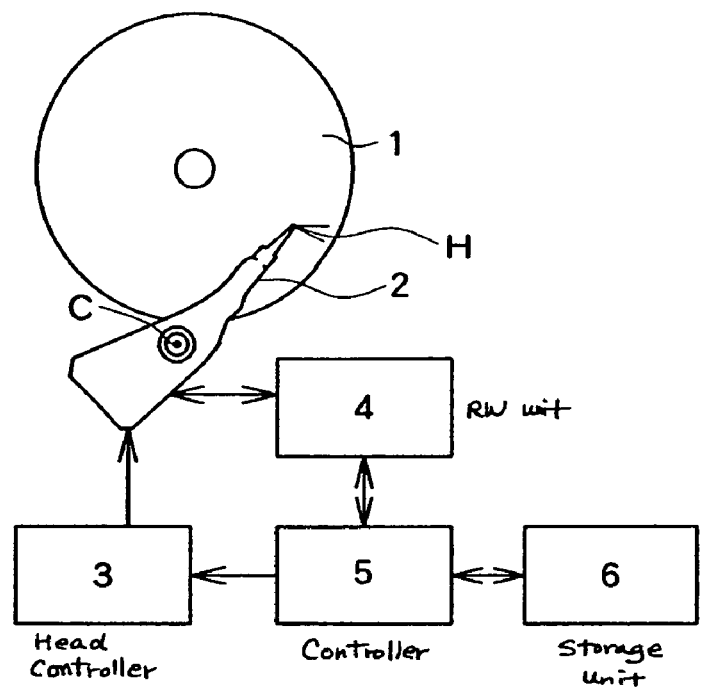
FIG. 1 is a block diagram of a disk drive in an embodiment according to the present invention.

A disk drive in a specific embodiment according to the present invention will be described with reference to the accompanying drawings. Referring to FIG. 1 showing the configuration of the disk drive of the present invention, the disk drive includes a disk medium 1, a head assembly 2, a head controller 3, a read/write unit (RW unit) 4, a controller 5 and a storage unit 6.

The head assembly 2 includes a magnetic head H that moves over the surface of the disk medium 1 relative to a surface of the disk medium 1, and accesses the disk medium 1 for magnetic information recording or reproducing (writing or reading).

The head controller 3 turns the head assembly 2 about its axis C to move the magnetic head H over the disk medium 1. In this embodiment, the head controller 3 controls the position of the magnetic head H so that the magnetic head H describes a substantially spiral trajectory relative to the surface of the disk medium 1. More specifically, the head controller 3 operates according to instructions given thereto by the controller 5 to gain sequential access to the disk medium 1. The head controller 3 uses support information provided by the RW unit 4 to follow the track.

The RW unit 4 decodes information read by the magnetic head H and gives the decoded information to the head controller 3 and the controller 5. The RW unit 4 encodes information given thereto by the controller 5 and gives the encoded information to the magnetic head H.

The controller 5 is, for example, a microprocessor that operates according to programs stored in the storage unit 6. Processes to be executed by the controller 5 will be described later.

The storage unit 6 includes a nonvolatile memory, such as a SRAM. The storage unit 6 holds a primary defect map. The primary defect map includes information about the results of the shipping inspection of the disk drive. For example, the primary defect map is a list of defective sector information about the relationship between position information about the positions of defective sectors and position information about the positions of sectors as alternatives to the defective sectors.

The storage unit 6 holds programs to be executed by the controller 5 and serves also as a work memory for the controller 5.

Figure 2:
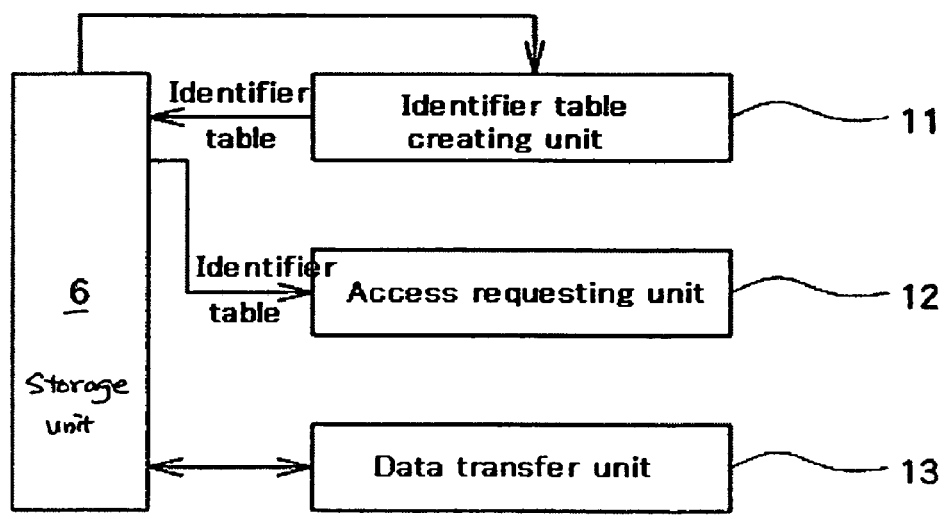
FIG. 2 is a block diagram of assistance in explaining an operation of the disk drive in the embodiment according to the present invention by way of example.

Processes to be executed by the controller 5 will be described. The controller 5 includes functional components shown in FIG. 2, namely, an identifier table creating unit 11, an access requesting unit 12 and a data transfer unit 13.

The identifier table creating unit 11 creates a sector entry defining the relationship among sector identifiers, logical addresses and information based on information about defective sectors. More specifically, as shown in FIG. 3, the sector entry describes the relationship among sector identifiers I, LBAs L and alternative sector position information D about the positions of sectors as alternatives to defective sectors if any. The alternative sector position information D is an example of information indicating that sector identifiers corresponding to defective sectors in the identifier table are defective. The identifier table creating unit 11 creates an identifier table including a sector entry for one track and stores the identifier table in a storage area of the table of the storage unit 6.

Since this embodiment performs a sequential access operation, the identifier table creating unit 11 stores a next logical address obtained by incrementing a logical address included in the sector entry by one in the storage unit 6 when the sector entry is created. The position of defective sector information next to the last defective sector information used on the primary defect map is held as a defect pointer.

When creating the next sector entry, the identifier table creating unit 11 refers to the next logical address stored in the storage unit 6 and the defective sector information at the position of the defective pointer on the primary defect map. When the sector entry thus created uses the defective sector information, i.e., when a sector related to the created sector entry is a defective sector, the defect pointer is incremented by one and the defect pointer stored in the storage unit 6 is overwritten. In addition, the logical address is also incremented by one and the logical address in the storage unit 6 is overwritten with the next logical address for storage. Thus, the sector entry for the sequential access operation can be simply created.

The access requesting unit 12 refers to the identifier table for a track to which the head assembly 2 is writing data or from which the head assembly 2 is reading data and gives the head controller 3 a sequential access instruction. Basically, the access requesting unit 12 provides an instruction requesting sequentially accessing the sector identifiers recorded on the identifier table.

The data transfer unit 13 executes an information read operation and an information write operation. In the information read operation, the data transfer unit 13 transfers information given thereto by the RW unit 4 to a data storage area in the storage unit 6. In the information write operation, the data transfer unit 13 reads information to be written from a data storage area of the storage unit 6 and gives the read information to the RW unit 4.

It is a feature of this embodiment that the identifier table creating unit 11 creates a sector entry related to sectors included in a track to be accessed next and records the sector entry on the identifier table while the data transfer unit 13 is performing the information read/write operation, i.e., while information is being written or read.

A basic operation of the controller 5 will be described. The access requesting unit 12 refers to one of the sector entries on the identifier table and provides an instruction requesting access to a sector identified by a sector identifier in the sector entry. In this example, it is supposed that reference is made to a sector entry relating with the p-th sector of the i-th track.

The data transfer unit 13 accesses the p-th sector on the i-th track to read or write information. If, for example, the data transfer unit 13 reads information, the data transfer unit 13 writes data written to the p-th sector on the i-th track to a data storage area of the storage unit 6.

Subsequently, the identifier table creating unit 11 creates a sector entry for the p-th sector of the (i+1)-th track. The sector entry related to the p-th sector of the i-th track is overwritten with the newly created sector entry. The controller 5 repeats the foregoing series of operations to carry out sequential access.

In this example, read position on the identifier table from which the access requesting unit 12 reads data is advanced by one position and write position to which the identifier creating table creating unit 11 writes data is advanced by one position.

The position of the magnetic head H is examined to see if the magnetic head H is on the center line of the track when the magnetic head H is moved to access a sector apart from a predetermined reference sector by a predetermined offset. In some cases, the controller 5 returns the magnetic head H to the reference sector and makes the magnetic head H rewrite information if the magnetic head H is dislocated from the center line of the track.

If the sector entry referred to is directly overwritten, reference to the sector entry related to the reference sector position cannot be made when this information rewrite operation is executed. Consequently, an identifier table from the reference sector position needs to be created again to execute the information rewrite operation.

The identifier table creating unit 11 obtains a sector identifier related to a sector entry to which reference is made every time the access requesting unit 12 makes reference to the sector entry. The distance between the sector identified by the sector identifier and the predetermined reference sector position on the track is calculated.

The reference sector position may be, for example "0" because, when the magnetic head H is moved so as to describe a substantially spiral trajectory relative to the disk medium 1 to access a sector, the position of the sector number "0" between tracks does not need to be taken into consideration in determining a seek time and there is no skew. When the reference sector position is "0", the number of a sector identified by the obtained sector identifier is a distance to be calculated.

The identifier table creating unit 11 examines the calculated distance to see if it is not smaller than a predetermined offset. If the calculated distance is not smaller than the predetermined offset, i.e., when the sector identified by the obtained sector identifier is apart from the reference sector position by a distance not shorter than the predetermined offset, a sector entry related to sectors on a track to be accessed next is created.

The identifier table creating unit 11 creates at least a sector entry related to sectors between a reference sector position on a track to be accessed next and a position apart from the reference sector position by an offset and overwrites the sector entry on the identifier table with the newly created sector entry.

When the accessed sector is apart from the reference sector position by a distance not shorter than the offset, the identifier table creating unit 11 creates a sector entry for a track to be accessed next every time a position read by the access request unit 12 advances by one position and a sector is accessed, and overwrites the referenced sector entry.

The disk drive in this embodiment having the foregoing configuration is connected to, for example a computer, namely, a host computer. The computer gives the disk drive an instruction requesting starting a sequential access operation together with information about an access starting position.

Then, the disk drive controls the magnetic head so as to describe a substantially spiral trajectory relative to the disk medium, makes reference to the identifier table associating sector identifiers in an accessed track with logical addresses, writes or reads information, and creates an identifier table for a track to be accessed next during an information write or read operation. An operation for creating the identifier table for a track to be accessed next may be suspended until a sector apart from the reference sector position on the accessed track by the predetermined offset is accessed.

The disk drive in this embodiment creates a sector entry for a track to be accessed next and the referenced sector entry is overwritten with the new sector entry every time the position read by the access requesting unit 12 on the identifier table advances one position and a sector is accessed. However, the disk drive does not need necessarily to perform such an operation. For example, the number of sector entries for a track to be accessed next may be equal to that of sector entries of the reference sector entries. Every time the number of referenced sector entries coincides with a predetermined number, the predetermined number of sector entries may be created.

The disk drive in this embodiment interrupts a sector entry creating operation, for example, while the distance between the accessed sector and the reference sector position is shorter than the offset from the reference sector position on the accessed track. Then, the disk drive resumes the sector entry creating operation upon the increase of the distance between the accessed sector and the reference sector position beyond the offset. The disk drive becomes a waiting state upon the correspondence of the created sector entry with the last accessed sector. Every time the number of the referenced sector entries coincides with a predetermined number, the predetermined number of sector entries is created. The creation of sector entries is interrupted after a sector entry related to the last sector of the accessed track has been overwritten. Thus the process of interrupting the creation of sector entries and remaining in a waiting state is repeated until the distance between the accessed sector and the reference sector position on the accessed track increases beyond the offset.

Thus the disk drive in this embodiment carries out the operation for accessing the disk and the operation for creating the identifier table simultaneously and hence the deterioration of performance can be prevented.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk drive comprising:
a disk medium;
a head configured to perform a read/write operation for accessing the disk medium to read information from and to write information to the disk medium;
a head controller configured to control the position of the head so that the head describes a substantially spiral trajectory relative to the surface of the disk medium; and
a controller configured to control the head controller, perform a read/write operation for writing or reading information with reference to an identifier table associating sector identifiers identifying sectors on an accessed track with logical block addresses, and create an identifier table for a track to be accessed next at the same time the read/write operation for a current accessed track is being performed.

2. The disk drive according to claim 1, wherein the controller obtains information about an identifier identifying an accessed sector, and creates an identifier table for a track to be accessed next while an access operation to access the disk medium is being performed when a sector identified by the obtained information is apart from a predetermined reference sector position by a distance longer than a predetermined offset.

3. The disk drive according to claim 2, wherein the controller is configured to create a sector entry related to sectors included in a track to be accessed next and record the sector entry on the identifier table while the access operation to access the disk medium is being performed when the sector identified by the obtained information is apart from the predetermined reference sector by a distance longer than the predetermined offset.

4. The disk drive according to claim 3, wherein the controller performs sequential access by repeatedly:
referring to one of the sector entries on the identifier table and providing an instruction requesting access to a sector in a current track identified by a sector identified in the sector entry;
accessing the sector to read or write information; and
creating a sector entry for a next track and overwriting the sector in the current track with the newly created sector entry when the sector identified by the obtained information is apart from the predetermined reference sector by a distance longer than the predetermined offset.

5. The disk drive according to claim 1 further comprising a storage unit for holding defective sector information specifying defective sectors;
wherein, when the controller creates an identifier table for a track to be accessed next, if the track to be accessed next has a sector identified as a defect sector by the defect sector information, the controller associates information to the effect that the sector identified is defective with a sector identifier identifying the defective sector in the identifier table.

6. A method of controlling a disk drive including a disk medium, and a read/write head capable of accessing the disk medium to carry out a read/write operation, said method comprising:
controlling the position of the read/write head such that the read/write head describes a substantially spiral trajectory relative to the disk medium;

performing a read/write operation to write information to or read information from an accessed track with reference to an identifier table associating identifiers identifying sectors on the track with logical addresses; and creating an identifier table for a track to be accessed next at the same time the read/write operation for a current accessed track is being performed.

7. The method of controlling a disk drive according to claim 6, wherein creating the identifier table comprises:

obtaining information about an identifier identifying an accessed sector; and creating an identifier table for a track to be accessed next while an access operation to access the disk medium is being performed when a sector identified by the obtained information is apart from a predetermined reference sector position by a distance longer than a predetermined offset.

8. The method of controlling disk drive according to claim 7, wherein creating the identifier table for a track to be accessed next comprises:

creating a sector entry related to sectors included in a track to be accessed next and recording the sector entry on the identifier table while the access operation to access the disk medium is being performed when the sector identified by the obtained information is apart from the predetermined reference sector by a distance longer than the predetermined offset.

9. The method of controlling disk drive according to claim 8, further comprising performing sequential access by repeatedly:

referring to one of the sector entries on the identifier table and providing an instruction requesting access to a sector in a current track identified by a sector identified in the sector entry;

accessing the sector to read or write information; and creating a sector entry for a next track and overwriting the sector in the current track with the newly created sector entry when the sector identified by the obtained information is apart from the predetermined reference sector by a distance longer than the predetermined offset.

10. The method of controlling disk drive according to claim 6, wherein the disk drive includes a storage unit for holding defective sector information specifying defective sectors; and wherein creating an identifier table for a track to be accessed next comprises, if the track to be accessed next has a sector identified as a defect sector by the defect sector information, associating information to the effect that the sector identified is defective with a sector identifier identifying the defective sector in the identifier table.

* * * * *